United States Patent [19]

Oh et al.

[11] Patent Number: 5,491,566
[45] Date of Patent: Feb. 13, 1996

[54] INTEGRATED INPUT-OUTPUT DEVICE HAVING A READING AND A PRINTING SECTION ON A SINGLE SUBSTRATE

[75] Inventors: Tae K. Oh; Kyu N. Choi; Chang W. Hur, all of Seoul, Rep. of Korea

[73] Assignee: Goldstar Co., Ltd., Seoul, Rep. of Korea

[21] Appl. No.: 157,738

[22] Filed: Nov. 24, 1993

[30] Foreign Application Priority Data

| Nov. 27, 1992 | [KR] | Rep. of Korea | 22585/1992 |
| Dec. 7, 1992 | [KR] | Rep. of Korea | 23515/1992 |
| Jan. 18, 1993 | [KR] | Rep. of Korea | 566/1993 |

[51] Int. Cl.$^6$ .................. H04N 1/03; H04N 1/032; H04N 1/036; B41J 2/335; B41J 2/355; B41J 2/445

[52] U.S. Cl. .................. 358/472; 358/482; 358/296; 358/300; 250/208.1; 347/136; 347/200; 347/211

[58] Field of Search .................. 358/472, 482, 358/296, 300, 494, 496, 497, 474, 471, 483; 250/208.1, 227.2, 227.26; 347/136, 239, 200, 211

[56] References Cited

U.S. PATENT DOCUMENTS

| 4,347,533 | 8/1982 | Ogawa | 358/296 |
| 4,466,020 | 8/1984 | O'Connell | 358/472 |
| 4,549,223 | 10/1985 | Ozawa | 358/472 |
| 4,635,130 | 1/1987 | Oi | 358/472 |
| 5,049,999 | 9/1991 | Stemmle | |
| 5,060,084 | 10/1991 | Kawahara et al. | 358/472 |
| 5,162,916 | 11/1992 | Stemmle et al. | |

*Primary Examiner*—Scott A. Rogers
*Attorney, Agent, or Firm*—John P. White

[57] ABSTRACT

An integrated input-output device for a data communication terminal equipment including a plurality of photoelectric converting circuits respectively arranged in n aligned blocks each including m aligned photoelectric converting elements, a plurality of first switching circuits respectively arranged in n aligned blocks each including m aligned thin film transistors respectively connected to the photoelectric converting elements of each corresponding one of the photoelectric converting circuits, a plurality of recording circuits respectively arranged in n aligned blocks each including m aligned recording elements, a plurality of second switching circuits respectively arranged in n aligned blocks each including m aligned thin film transistors respectively connected to the recording elements of each corresponding one of the recording circuits, n gate address lines respectively connected in common to gate electrodes of all thin film transistors of the same block-numbered first and second switching circuits, and m data lines respectively connected in common to source/drain electrodes of the same numbered thin film transistors of the same block-numbered first and second switching circuits.

7 Claims, 6 Drawing Sheets

INTEGRATED INPUT-OUTPUT DEVICE HAVING A READING AND A PRINTING SECTION ON A SINGLE SUBSTRATE

BACKGROUND OF THE INVENTION

The present invention relates to an input-output device for a communication terminal equipment, and more particularly to an integrated input-output device for a data communication wherein a contact image sensor as an input unit and a printer as an output unit are integrated on a single circuit board.

Generally, a data communication terminal equipment includes an input device and an output device separately constructed from each other and available as separate units. Such a data communication terminal equipment further includes a transmission device for transmitting a signal from the input unit to a copy machine or a facsimile, and a device for applying an electrical signal to the output unit. These devices are also constructed as separate units. As a result, the overall construction of the data communication terminal equipment is complex.

The above-mentioned conventional input and output devices for the data communication terminal equipment will be described, in conjunction with FIGS. 1 to 4.

FIG. 1 is a perspective view of a conventional input device, for example, a read scanner. FIG. 2 is a sectional view of a contact image sensor equipped in the read scanner of FIG. 1. As shown in the drawings, the conventional input device comprises an optical output unit 2 for projecting light beams onto an original document 1, a lod lens array 3 for focusing the light beams reflected from the optical output unit 2 at different intensities depending on letters and characters on the original document 1, and an image sensing unit for sensing the reflected light beams fed through the lod lens unit 3 and converting them into electrical signals to be outputted.

In FIGS. 1 and 2, the reference numeral 4 denotes a sensor circuit board.

In operation of the input device having the above-mentioned construction, light beams emitted from the optical output unit 2 are projected onto the original document 1 and then reflected therefrom. The reflected light beams are then fed to the image sensing unit 5 through the lod lens unit 3 at different intensities depending on characters of the original document 1. The image sensing unit 5 converts the received optical signals into electrical signals having different current intensities determined by respective grayscale values of the characters and outputs them.

As shown in FIG. 2, the image sensing unit 5 comprises a photodiode region PD including a multilayered structure constituted by a transparent electrode 6, a semiconductor layer (a-Si:H) 8 and a low concentration p type semiconductor layer 9, and a thin film transistor region TFT including a multilayered structure constituted by a gate electrode 10, an insulating film 11, a semiconductor layer 12, an ohmic contact layer 13 and a source/drain electrode 14. The image sensing unit 5 further comprises a matrix wiring region L connected to the drain electrode of the thin film transistor region TFT and adapted to transmit a signal.

In this case, the low concentration p type semiconductor layer 9 of the photodiode region PD is connected to the source electrode of the thin film transistor region TFT.

In FIG. 2, the reference numerals 7 and 15 denote an insulating film and a metal electrode, respectively.

on the other hand, FIG. 3 is a sectional view of a conventional output device, for example, a thermal printer head. FIG. 4 is a sectional view of a heater of the thermal printer head of FIG. 3. FIG. 5 is a plan view illustrating a construction for connecting thermal printer heads to drive ICs.

As shown in FIG. 3, the thermal printer head as the conventional output device includes a heater 16 comprising a heater substrate 17 and a printed circuit board 19 both formed on a heat sink 20. The heater 16 is connected to a drive IC 18.

As shown in FIG. 4, the heater 16 is fabricated by coating a glaze layer 24 to a thickness of 800 to 1,500 Å over the substrate 17 made of $Al_2O_3$. Over the glaze layer 24, a resist film 23 is formed. Thereafter, a metal layer 22 made of Al is coated to a thickness of 1 µm over the resist film 23. A selected portion of the metal layer 22 is then removed to form electrodes which are then subjected to an isolation treatment. A common electrode 21 is formed over one of the electrodes comprised of the metal layer 22. Over the entire exposed upper surface of the resulting structure, a passivation film 25 made of SiON is formed to a thickness of 4 µm, thereby obtaining a heater. As a voltage is applied to both the common electrode 21 and the other electrode comprised of the metal layer 22, a heat is generated.

As shown in FIG. 5, the connection of thermal printer heads 26 to drive ICs 18 is achieved by directly connecting respective pads of thermal printer heads with corresponding pads of the drive ICs 18. For an original document of $A_4$ size, 27 drive ICs 18 should be used so as to control the thermal printer heads 26 by blocks. In this case, the number of wires connecting the thermal printer head 26 with the drive ICs 18 is 1728 identical to the number of thermal printer heads 26 in a $G_3$ 200 pi facsimile.

In the $G_3$-grade facsimile, 1728 pixels are sequentially driven by the drive ICs 18 in 10 msec. In case of $G_4$-grade facsimiles, 3456 pixels can be driven in one msec. As a voltage of about several tens V, for example, 20 V is applied to each thermal printer head 26, a heat is generated from the heater of the thermal printer head 26. The heat is transferred to a heat-sensitive paper which is, in turn, discolored by the heat.

The discolored area of the heat-sensitive paper subjected to the heat appears black color so that it is distinguished from other areas subjected to no heat and appearing white color. In such a manner, characters and designs are duplicated on the heat-sensitive paper appears.

However, the conventional data communication terminal equipment is expensive and bulky because its input and output devices are constructed separately from each other. Moreover, this data communication terminal equipment has a limitation on development of a portable unit due to the bulky construction.

SUMMARY OF THE INVENTION

The present invention has been made in view of the above-mentioned problems encountered in the prior art and an object of the invention is to provide a data communication terminal equipment having an inexpensive and compact construction including an integrated input-output device.

In accordance with the present invention, this object can be accomplished by providing an integrated input-output device for a data communication terminal equipment comprising: photoelectric converting means for converting an optical signal into an electrical signal and generating a photoelectric charge; first switching means for selectively outputting said photoelectric charge from said photoelectric converting means; recording means for recording an input data signal; second switching means for selectively outputting data to be recorded in said recording means; a driving circuit for controlling the first and second switching means; and an lead-out and recording circuit for leading out the photoelectric charge from the first switching means and applying the data received from the outside to the recording means via the second switching means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
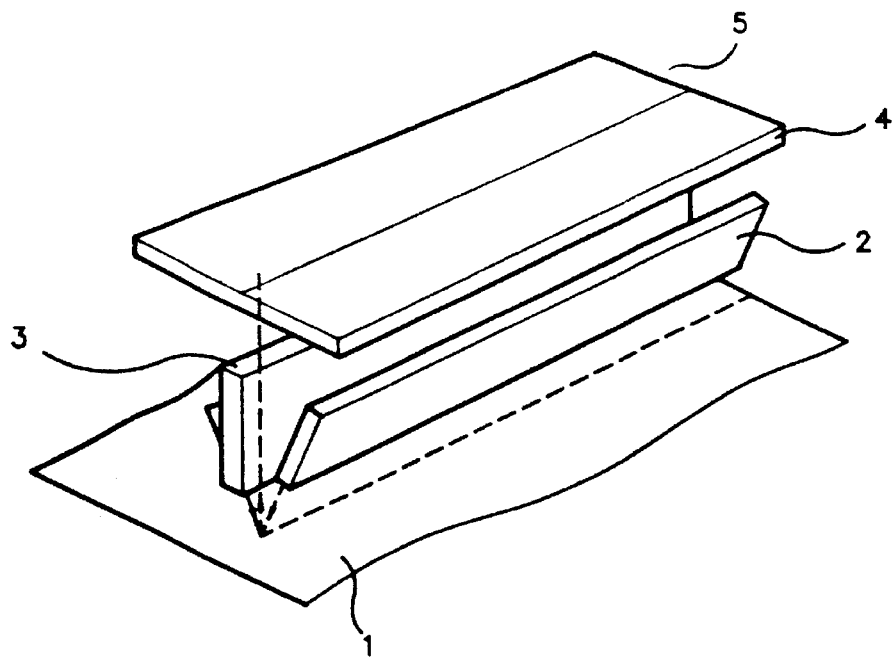
FIG. 1 is a perspective view of a conventional input device.
Figure 2:
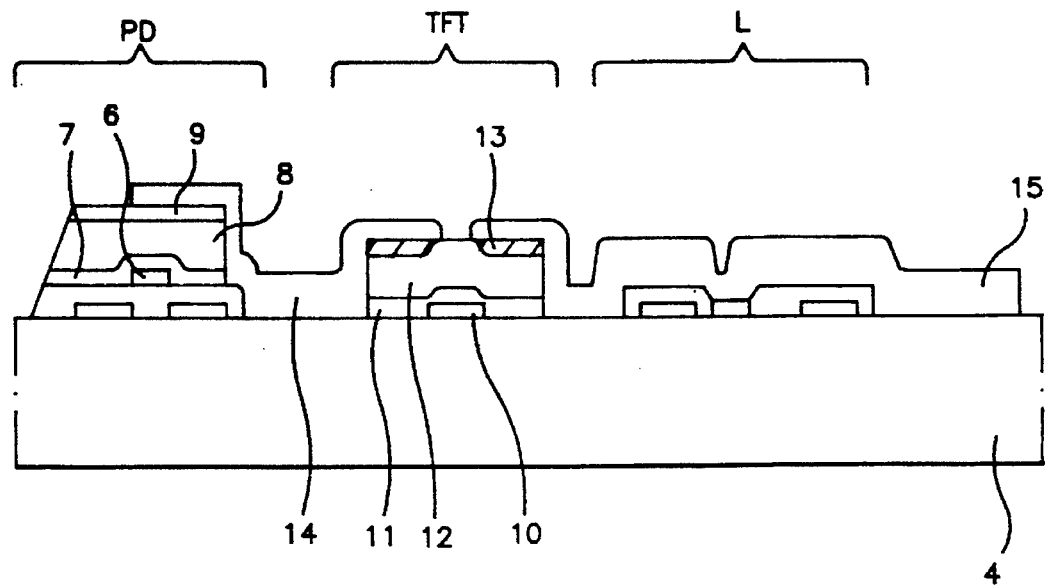
FIG. 2 is a sectional view of a contact image sensor equipped in the input device of FIG. 1.
Figure 3:
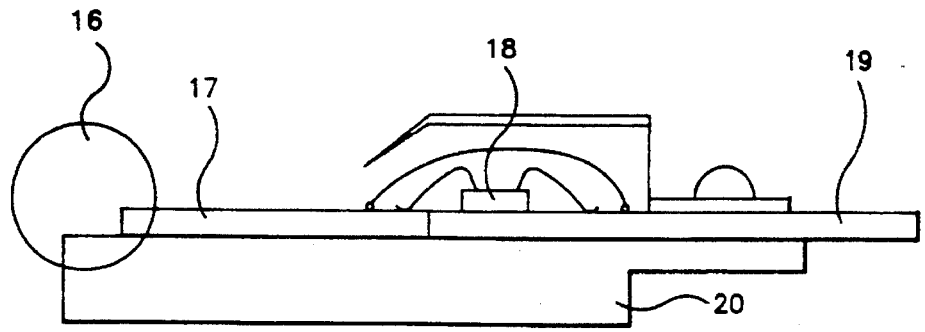
FIG. 3 is a sectional view of a thermal printer head as a conventional output device.
Figure 4:
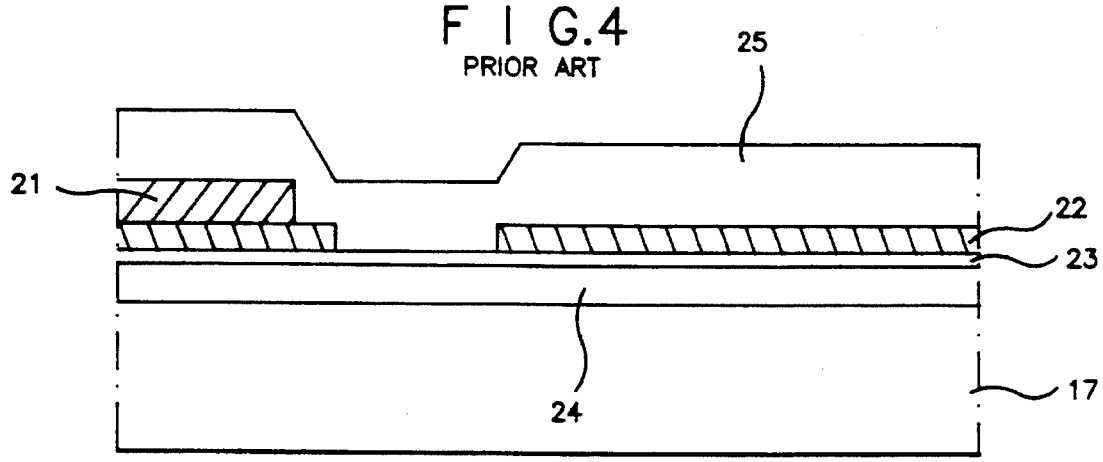
FIG. 4 is sectional view of a heater of the thermal printer head of FIG. 3.
Figure 5:
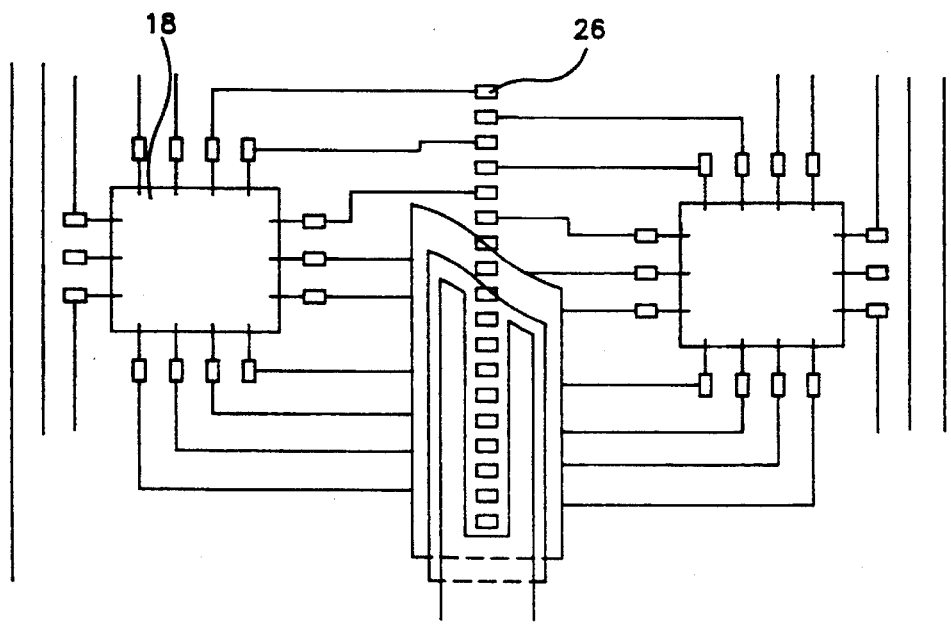
FIG. 5 is a plan view illustrating a construction for connecting thermal printer heads to drive ICs.
Figure 6:
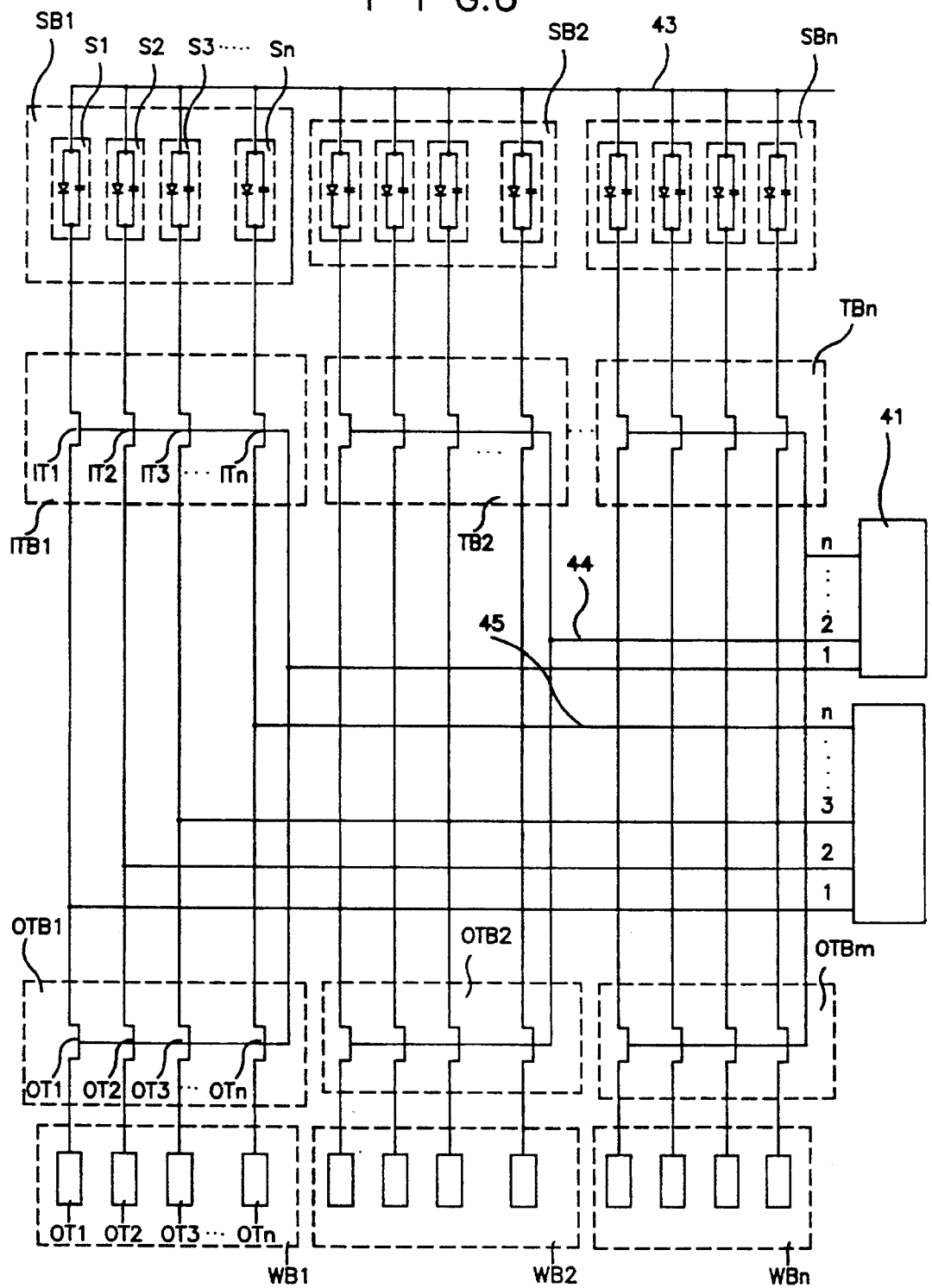
FIG. 6 is a circuit diagram of an integrated input-output device in accordance with the present invention.
Figure 7:
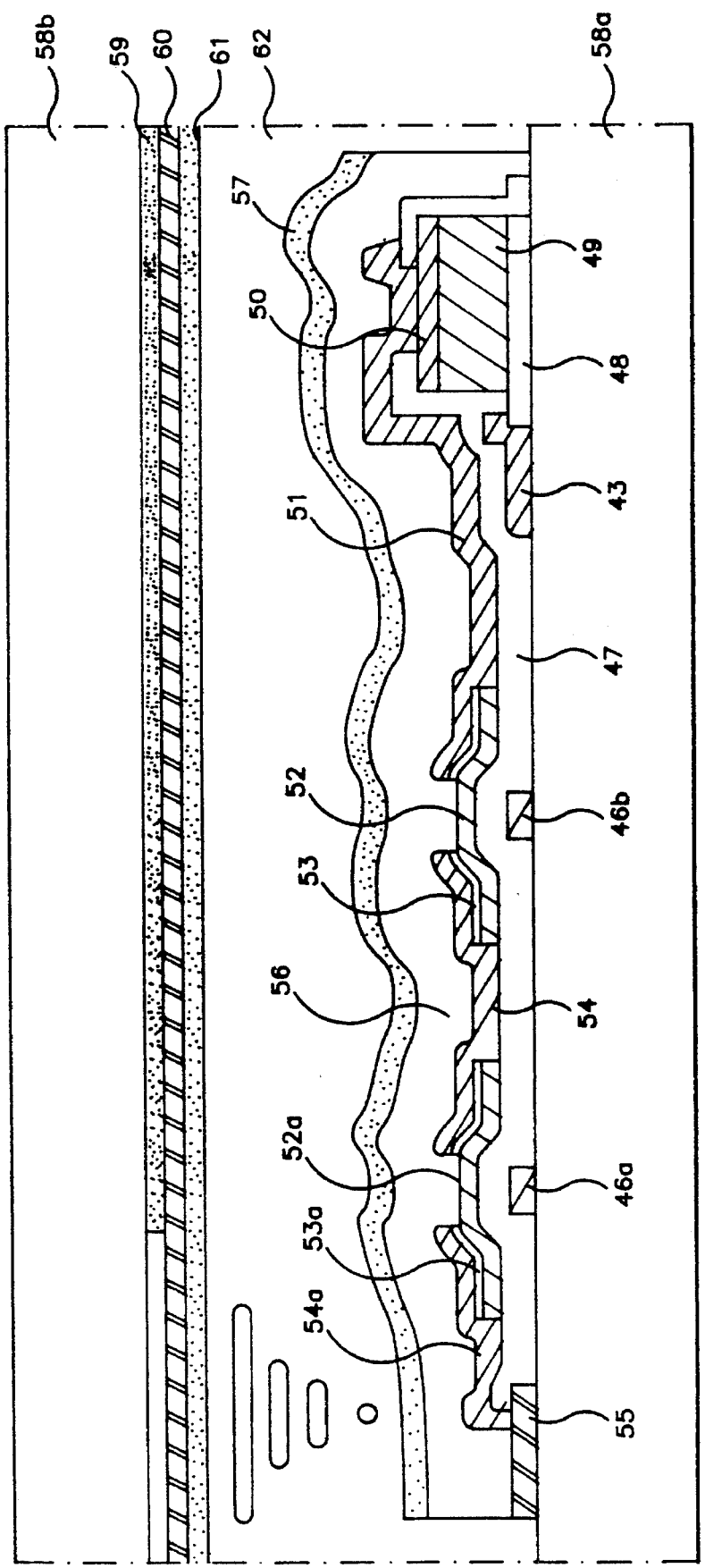
FIG. 7 is a cross-sectional view taken along the line A—A' of FIG. 6, showing a sectional structure of the integrated input-output device of FIG. 6 in accordance with a first embodiment of the present invention.

FIGS. 6 and 7 illustrate an integrated input-output device for a data communication terminal equipment in accordance with a first embodiment of the present invention, respectively.

FIG. 6 is a circuit diagram of the integrated input-output device. FIG. 7 is a sectional view of the integrated input-output device.

As shown in FIG. 6, the integrated input-output device includes an input unit and an output unit integral with the input unit. The input unit comprises a plurality of photoelectric converting circuits $SB_1$ to $SB_n$ respectively arranged in n aligned blocks each including m aligned photodiodes $S_1$ to $S_m$ and adapted to convert optical signals reflected from an original document into electrical signals and generate photoelectric charges, and a plurality of first switching circuits $ITB_1$ to $ITB_n$ respectively arranged in n aligned blocks each including m aligned thin film transistors $IT_1$ to $IT_m$ respectively connected to the photodiodes $S_1$ to $S_m$ of each corresponding one of the photoelectric converting circuits $SB_1$ to $SB_n$ and adapted to perform switching operations for selectively outputting photoelectric charges from the photoelectric converting circuits $SB_1$ to $SB_n$. On the other hand, the output unit comprises a plurality of recording circuits $WB_1$ to $WB_n$ respectively arranged in n aligned blocks each including m aligned liquid crystal (LC) shutters $LC_1$ to $LC_m$ and adapted to convert data to be recorded in an optical printer into optical signals and scanning the optical signals in the form of light, and a plurality of second switching circuits $OTB_1$ to $OTB_n$ respectively arranged in n aligned blocks each including m aligned thin film transistors $OT_1$ to $OT_m$ respectively connected to the LC shutters $LC_1$ to $LC_m$ of each corresponding one of the recording circuits $WB_1$ to $WB_n$ and adapted to perform switching operations for selectively inputting the data at the recording circuits $WB_1$ to $W_n$. Each thin film transistor of the second switching circuits $OTB_1$ to $OTB_n$ is comprised of a high voltage thin film transistor.

The input-output device further includes n gate address lines 44 respectively connected in common to gate electrodes of all thin film transistors of the same block-numbered first and second switching circuits $ITB_1$ to $ITB_n$ and $OTB_1$ to $OTB_n$ and adapted to apply drive pulse signals to the first and second switching circuits $ITB_1$ to $ITB_n$ and $OTB_1$ to $OTB_n$, m data lines 45 respectively connected in common to source/drain electrodes of the same numbered thin film transistors of the same block-numbered first and second switching circuits $ITB_1$ to $ITB_n$ and $OTB_1$ to $OTB_n$ and adapted to transmit data, a driving circuit 41 adapted to apply pulse signals for respectively driving the first and second switching circuits $ITB_1$ to $ITB_n$ and $OTB_1$ to $OTB_n$ via the n gate address lines 44, a lead-out and recording circuit 42 adapted to lead out respective photoelectric charges from the photoelectric converting circuit $SB_1$ to $SB_n$ via the first switching circuits $ITB_1$ to $ITB_n$ and the data lines 45 and apply data to be recorded to the recording circuits $WB_1$ to $WB_n$ via the m data lines 45 and the second switching circuits $OTB_1$ to $OTB_n$, and a signal line 43 for applying a shutter voltage to the photoelectric converting circuit $SB_1$ to $SB_n$.

Alternatively, the input-output device may include m gate address lines 44 respectively connected in common to gate electrodes of the same numbered thin film transistors of the same block-numbered first and second switching circuits $ITB_1$ to $ITB_n$ and $OTB_1$ to $OTB_n$, and n data lines 45 respectively connected in common to source/drain electrodes of all thin film transistors of the same block-numbered first and second switching circuits $ITB_1$ to $ITB_n$ and $OTB_1$ to $OTB_n$. Each of the recording circuits $WB_1$ to $WB$, may comprises a plurality of thin film edge emitter field light emitting elements, in place of LC Shutters.

FIG. 7 is a cross-sectional view taken along the line A—A' of FIG. 6 and shows a sectional structure of the integrated input-output device of FIG. 6 in accordance with a first embodiment of the present invention. The structure is obtained by fabricating the input unit and the output unit of FIG.. 6 on a single substrate.

In accordance with the first embodiment, a transparent electrode 48, a semiconductor layer 49 and a metal electrode 50 are formed, in this order, over one side portion of a first glass substrate 58a to obtain one photodiode of the photoelectric converting circuit $SB_2$. In one side of the photodiode, a gate electrode 46b, an insulating layer 47, a semiconductor layer 52, an ohmic contact layer 53, a source electrode 51 and a drain electrode 54 are sequentially formed over the first glass substrate 58a to obtain one thin film transistor of the first switching circuit $ITB_2$. The metal electrode 50 of the photodiode is connected with the source electrode 51 of the thin film transistor. Thus fabrication of the input unit on the substrate 58a is achieved.

In accordance with the first embodiment, a gate electrode 46a, an insulating layer 47, a semiconductor layer 52a, an ohmic contact layer 53a, a source electrode 54, and a drain electrode 54a are formed over the other side portion of the first glass substrate 58a to obtain one thin film transistor of the second switching circuit $OTB_2$. Adjacent to the thin film transistor of the second switching circuit $OTB_2$, a transparent electrode 55 is formed on the substrate 58a to obtain one shutter of the recording circuit $WB_2$. The drain electrode 54a of thin film transistor of the second switching circuit $OTB_2$ is connected with the transparent electrode 55 of the shutter. The source electrode 54 of thin film transistor of the second switching circuit $OTB_2$ is connected with the drain electrode 54 of thin film transistor of the first switching circuit $ITB_2$. Thus fabrication of the output unit on the substrate 58a is achieved.

Over the entire exposed upper surface of the resulting structure, a passivation insulating film 56 and an alignment layer 57 are then formed.

On the other hand, a black matrix 59 made of a metal, such as Cr, for shielding light is formed over a second glass substrate 58b except for a portion of the second glass substrate 58b where a shutter region for the recording circuit is formed. Over the black matrix 59, a transparent electrode 60 and an alignment layer 61 are formed to obtain the signal line.

Thereafter, the first and second glass substrates 58a and 58b are bonded to each other so that they define a space therebetween. Finally, a liquid crystal 62 is filled in the space between the first and second glass substrates 58a and 58b.

Figure 8:
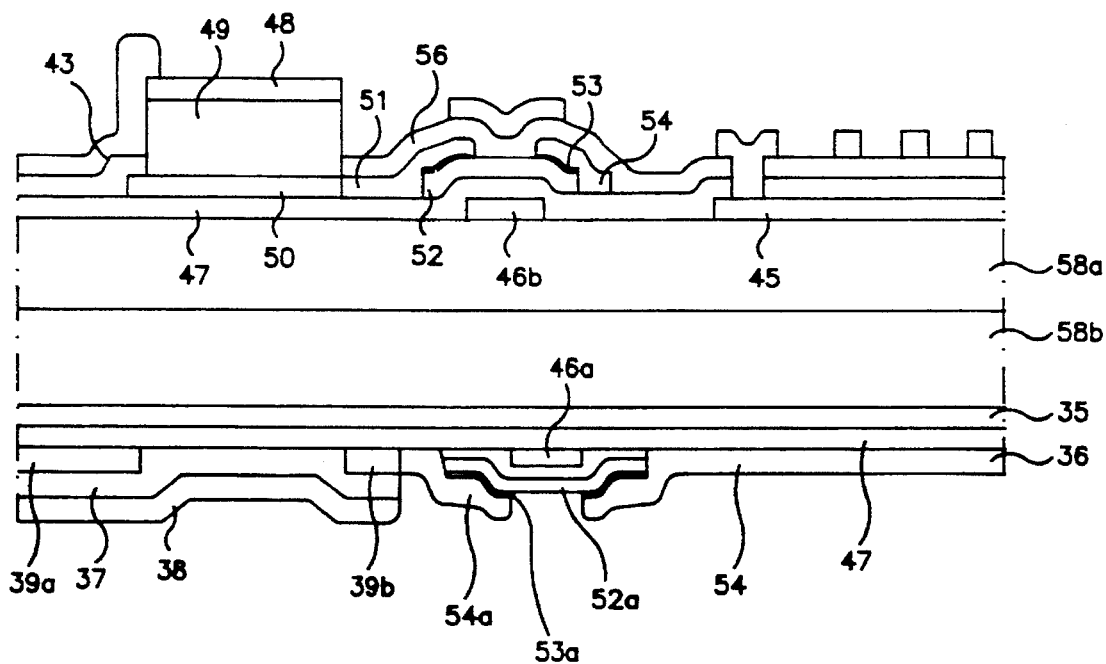
FIG. 8 is a cross-sectional view taken along the line A—A' of FIG. 6, showing a sectional structure of the integrated input-output device of FIG. 6 in accordance with a second embodiment of the present invention.
Figure 9:
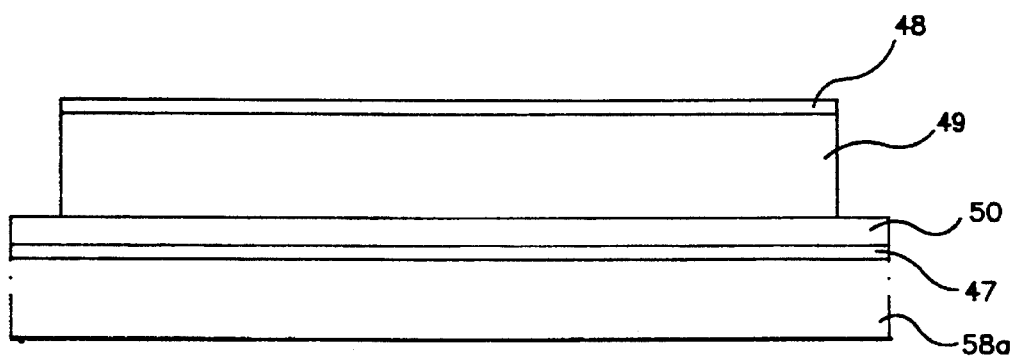
FIG. 9 is a sectional view of a photodiode region of FIG. 7 or FIG. 8.
Figure 10:
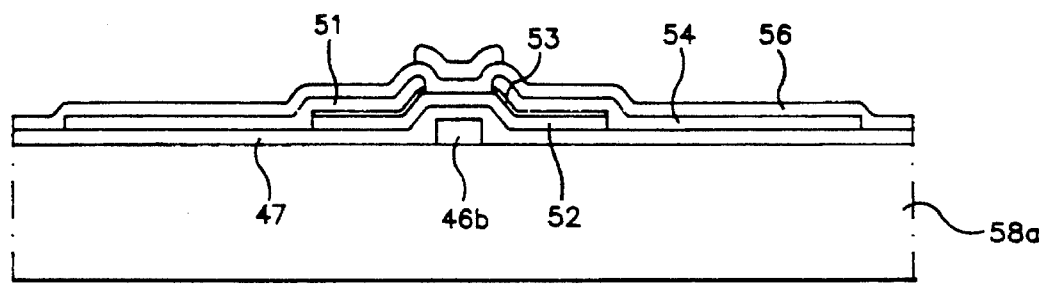
FIG. 10 is a sectional view of a thin film transistor of a first switching circuit of FIG. 7 or FIG. 8.
Figure 11:
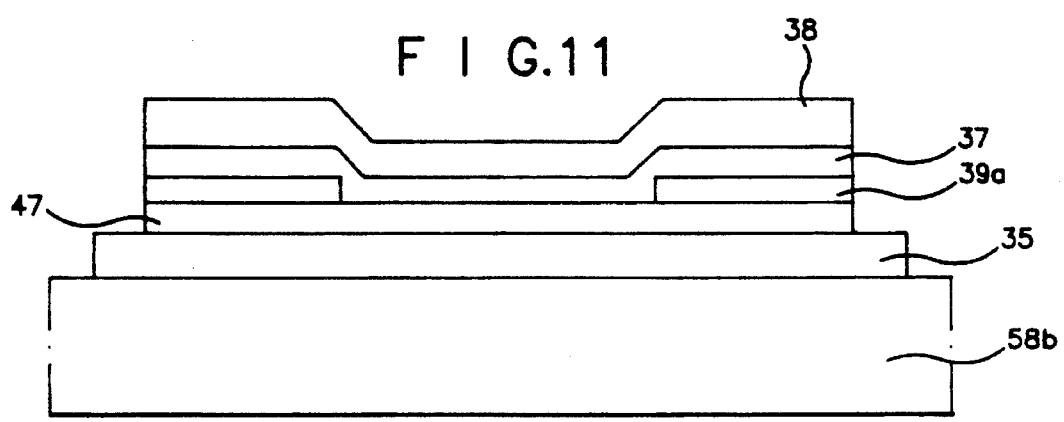
FIG. 11 is a sectional view of a thermal printer head of FIG. 8.
Figure 12:
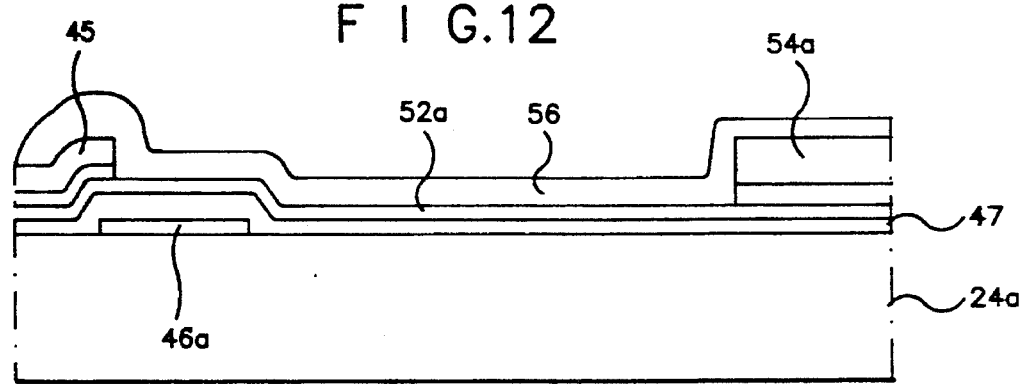
FIG. 12 is a high voltage thin film transistor of a second switching circuit of FIG. 7 or FIG. 8.

FIG. 8 shows a sectional structure of the integrated input-output device of FIG. 6 in accordance with a second embodiment of the present invention. The structure is obtained by fabricating the input unit and the output unit of FIG. 6 on separate substrates, respectively.

In accordance with the second embodiment, a metal electrode 50, a semiconductor layer 49 and a transparent electrode 48 are formed, in this order, over one side portion of a first glass substrate 58a to obtain one photodiode of the photoelectric converting circuit $SB_2$. In one side of the photodiode, a gate electrode 46b, an insulating layer 47, a semiconductor layer 52, an ohmic contact layer 53, a source electrode 51 and a drain electrode 54 are sequentially formed over the first glass substrate 58a to obtain one thin film transistor of the first switching circuit $ITB_2$. The metal electrode 50 of the photodiode is connected with the source electrode 51 of the thin film transistor. The drain electrode 54 is connected with the data line 45. Thus fabrication of the input unit on the substrate 58a is achieved.

In accordance with the second embodiment, a thermal isolation film 35 having a thickness of about 40 to about 70 μm and a heat generating resistor 36 having a thickness of about 500 to about 1,500 Å are sequentially formed over a second glass substrate 58b. A gate electrode 46a, an insulating layer 47, a semiconductor layer 52a, an ohmic contact layer 53a, a source electrode 54, and a drain electrode 54a are formed over one side portion of the heat generating resistor 36 to obtain one thin film transistor of the second switching circuit $OTB_2$. Adjacent to the thin film transistor of the second switching circuit $OTB_2$, one recording circuit is formed. In FIG. 8, a thermal printer head for the recording circuit is shown.

The thermal printer head includes a pair of metal electrodes 39a and 39b made of Al and respectively disposed in both sides of the recording circuit, an insulating film 37 made of $SiO_2$ and formed to a thickness of about 1 μm over both the metal electrodes 39a and 39b, and a passivation film 38 made of $Ta_2O$ or SiN and formed over the insulating film 37.

In this case, the drain electrode 54a of thin film transistor of the second switching circuit $OTB_2$ is formed integrally with the metal electrode 39b of the thermal printer head.

Finally, the first and second glass substrates 58a and 58b having the above-mentioned structures are bonded to each other.

Although not shown, the gate electrodes of all thin film transistors of the same block-numbered first and second switching circuits $ITB_1$ to $ITB_n$ and $OTB_1$ to $OTB_n$ in each of the structures of FIGS. 7 and 8 are connected in common to the driving circuit 41 by using tap tape and package processes so that drive voltages can be applied to the first and second switching circuits $ITB_1$ to $ITB_n$ and $OTB_1$ to $OTB_n$, as shown in FIG. 6. The source/drain electrodes of the first and second switching circuits $ITB_1$ to $ITB_n$ and $OTB_1$ to $OTB_n$ are connected to the lead-out recording circuit 42 in a manner as descried in FIG. 6, by using tap tape and package processes.

In each of thin film transistors of the second switching circuits, the semiconductor layer 52a (channel region) disposed between the source and drain electrodes has a width greatly larger than that of the gate electrode 46a.

The integrated input-output device for a data communication terminal equipment having the above-mentioned construction in accordance with the present invention may include a solid state image sensor as its input unit and a light emitting display element or a laser beam printer (LBP) as its output unit.

Operation of the integrated input-output device of the present invention will now be described.

As light beams emitted from a light source and then received in the integrated input-output device which is one of those shown in FIGS. 6 to 12, they are reflected from an original document while being varied in intensity depending on the content of the original document and then applied in the form of optical signals to the photoelectric converting circuits, respectively. The photoelectric converting circuits generate photoelectric charges corresponding to the intensities of received optical signals, respectively. At this time, the generated photoelectric charges are stored in capacitors of the photoelectric converting circuits, respectively, because a voltage of −5 V is being applied to the transparent electrodes 48 of the photoelectric converting circuits via the signal line 43.

At this state, the driving circuit 41 applies drive pulse signals to respective gate electrodes 46 of thin film transistors via the gate address lines 44 so that the thin film transistors of each block are sequentially turned on so as to send the photoelectric charges stored in the capacitors to the lead-out and recording circuit 42 via the data lines 45, respectively.

At this time, although the first switching circuits are turned on by the pulse signals applied from the driving circuit 41 via the gate address liens 44, the second switching circuits are not turned on because the pulse signals have a low level. This is because the second switching circuits are constituted by high voltage thin film transistors.

The photoelectric charges received in the lead-out and recording circuit 42 are transmitted according to an operation of the data communication terminal equipment.

The output unit is operated upon receiving electrical signal data indicative of letters and characters from the outside. When the electrical signal data is received, the driving circuit 41 applies pulse signals to the gate electrodes 46a of thin film transistors of the second switching circuits $OTB_1$ to $OTB_n$ via the gate address lines 44.

By the pulse signals, the thin film transistors of each block are sequentially turned on, thereby causing letter or character data from the lead-out and recording circuit 42 to be transmitted to the recording circuits $WB_1$ to $WB_n$ via the data lines 45. The recording circuits $WB_1$ to $WB_n$ converts the received electrical data into optical signals and then sends them to a drum of an photomagnetic printer so that they can be recorded.

Where the recording circuits $WB_1$ to $WB_n$ are constituted by LC shutters, as shown in FIG. 7, the LC shutters receives the electrical data and polarizes the liquid crystal 62 so that the liquid crystal 62 can permit light beams to pass therethrough or shield the light beams so as to scan optical signals onto the drum.

Where the recording circuits $WB_1$ to $WB_n$ are constituted by thermal printer heads, as shown in FIG. 8, the heat generating resistors 36 of the thermal printer heads generate heat selectively, based on data received according to the operations of the second switching circuits $OTB_1$ to $OTB_n$. The heat from the selected heat generating resistors 36 is transferred to a heat-sensitive paper.

As apparent from the above description, the present invention provides an integrated input-output device for a data communication terminal equipment wherein an input unit and an output unit are integrated, thereby capable of achieving a compact and inexpensive construction of the data communication terminal equipment.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated input-output device having a reading and a printing section on a single substrate comprising:

a plurality of photoelectric converting circuits respectively arranged in n aligned blocks each including m aligned photoelectric converting elements and adapted to convert optical signals into electrical signals and generate photoelectric charges;

a plurality of first switching circuits respectively arranged in n aligned blocks each including m aligned thin film transistors respectively connected to the photoelectric converting elements of each corresponding one of the photoelectric converting circuits and adapted to selectively output the photoelectric charges from the photoelectric converting circuits;

a plurality of recording circuits respectively arranged in n aligned blocks each including m aligned recording elements and adapted to record data to be printed;

a plurality of second switching circuits respectively arranged in n aligned blocks each including m aligned thin film transistors respectively connected to the recording elements of each corresponding one of the recording circuits and adapted to apply data to be recorded to the recording circuits;

n gate address lines respectively connected in common to gate electrodes of all thin film transistors of the same block-numbered first and second switching circuits;

m data line respectively connected in common to source/drain electrodes of the same numbered thin film transistors of the same block-numbered first and second switching circuits;

a driving circuit adapted to sequentially apply gate pulse signals to the gate address lines; and a lead-out and recording circuit adapted to lead out the photoelectric charges from the photoelectric converting circuit via the first switching circuits and the data lines and output the data to be recorded in the recording circuits via the data lines and the second switching circuits.

2. An integrated input-output device in accordance with claim 1, wherein said gate address lines are m in number which are respectively connected in common to gate electrodes of the same numbered thin film transistors of the same block-numbered first and second switching circuits.

3. An integrated input-output device in accordance with claim 1, wherein each of said photoelectric converting elements comprises a photodiode.

4. An integrated input-output device in accordance with claim 1, wherein each of said recording elements comprises one of a liquid crystal shutter and a thermal printer head.

5. An integrated input-output device in accordance with claim 1, wherein each of said thin film transistors of each second switching circuit comprises a high voltage thin film transistor.

6. An integrated input-output device having a reading and a printing section on a single substrate comprising:

a first transparent substrate;

a photoelectric converting region formed over one side portion of said first transparent substrate and adapted to convert an optical signal into an electrical signal and generate a photoelectric charge;

a first switching circuit formed over a portion of the first transparent substrate in one side of said photoelectric converting region and adapted to selectively output said photoelectric charge from the photoelectric converting region;

a second switching circuit formed over a portion of the first transparent substrate in one side of said first switching circuit and adapted to switch data values, said second switching circuit having a source/drain electrode in common with the first switching circuit;

a liquid crystal shutter formed over a portion of the first transparent substrate in one side of said second switching circuit and adapted to output electrical data from the second switching circuit in the form of an optical signal;

a second transparent substrate bonded to the first transparent substrate to define a space therebetween;

a black matrix formed over said second transparent substrate except for a region corresponding to said liquid crystal shutter and adapted to shield a light beam;

a transparent electrode formed over both the black matrix and the second transparent substrate; and a liquid crystal layer disposed in said space and adapted to permit a light beam to pass therethrough or shield the light beam.

7. An integrated input-output device having a reading and a printing section on a single substrate comprising:

a first glass substrate;

a photoelectric converting region formed over one side portion of said first glass substrate and adapted to convert an optical signal into an electrical signal and generate a photoelectric charge;

a first switching circuit formed over a portion of the first glass substrate in one side of said photoelectric converting region and adapted to selectively output said photoelectric charge from the photoelectric converting region;

a first gate address line and a first data line formed over a portion of the first glass substrate in one side of said first switching circuit and adapted to respectively transmit a gate signal and a data signal from the first switching circuit;

a second glass substrate bonded to the first glass substrate;

a thermal isolation film and a heat generating resistor sequentially formed over said second glass substrate;

a thermal printer head region formed over a portion of said heat generating resistor corresponding to the photoelectric converting region;

a second switching circuit formed over a portion of the heat generating resistor in one side of said thermal printer head region and adapted to selectively apply data to be recorded to the thermal printer head region; and a second gate address line and a second data line formed over a portion of the heat generating resistor in one side of said second switching circuit and adapted to respectively transmit a gate signal and a data signal to the second switching circuit.

* * * * *